United States Patent [19]

Faroudja

[11] 4,443,817

[45] Apr. 17, 1984

[54] CHROMA NOISE REDUCTION SYSTEM FOR QUADRATURE MODULATED COLOR TELEVISION PICTURE SIGNALS

[76] Inventor: Yves C. Faroudja, 26595 Anacapa Dr., Los Altos Hills, Calif. 94022

[21] Appl. No.: 325,039

[22] Filed: Nov. 25, 1981

[51] Int. Cl.³ .............................................. H04N 5/21
[52] U.S. Cl. ...................................... 358/167; 358/36
[58] Field of Search ................... 358/167, 36, 31, 181, 358/40, 174

[56] References Cited

U.S. PATENT DOCUMENTS

| | | | |
|---|---|---|---|
| 3,978,409 | 8/1976 | Dolby | 358/36 |
| 4,064,530 | 12/1977 | Kaiser | 358/167 |
| 4,107,739 | 8/1978 | Rossi | 358/167 |
| 4,240,105 | 12/1980 | Faroudja | 358/31 |
| 4,246,610 | 1/1981 | Takahashi | 358/167 |
| 4,291,333 | 9/1981 | Warnock | 358/167 |
| 4,355,333 | 10/1982 | Sato | 358/36 |

*Primary Examiner*—Tommy P. Chin
*Attorney, Agent, or Firm*—David B. Harrison

[57] ABSTRACT

The system includes a recirculating delay line signal path which feeds a fractional component of delayed chroma to a summing junction where it is combined in proper phase with undelayed chroma and the composite is ordinarily put out. In the event of a detected vertical transition in the luminance channel, a control signal is generated in proportion to the amplitude of the detected transition. The control signal is used to switch the output over to the input chroma in proportion to the amplitude thereof. The vertical transition may be detected in luminance or in chrominance, or both in which case the control signal is a combination of the two. The chrominance transition control signal may be inhibited in the absence of chroma in the combed chroma path.

21 Claims, 4 Drawing Figures

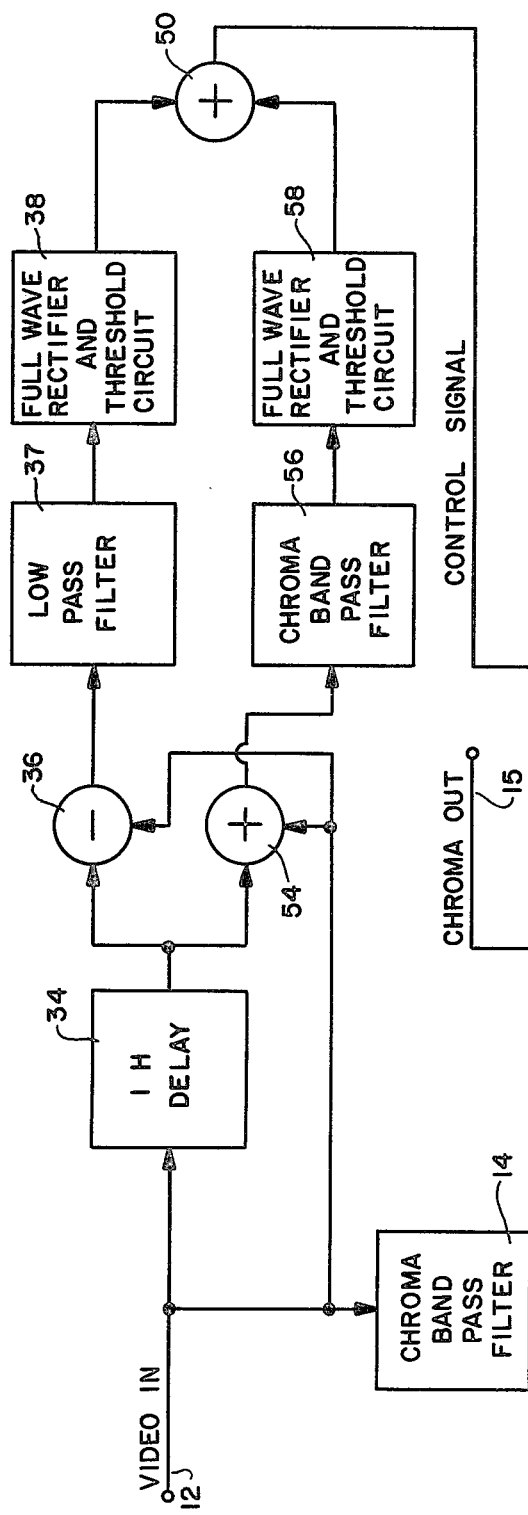
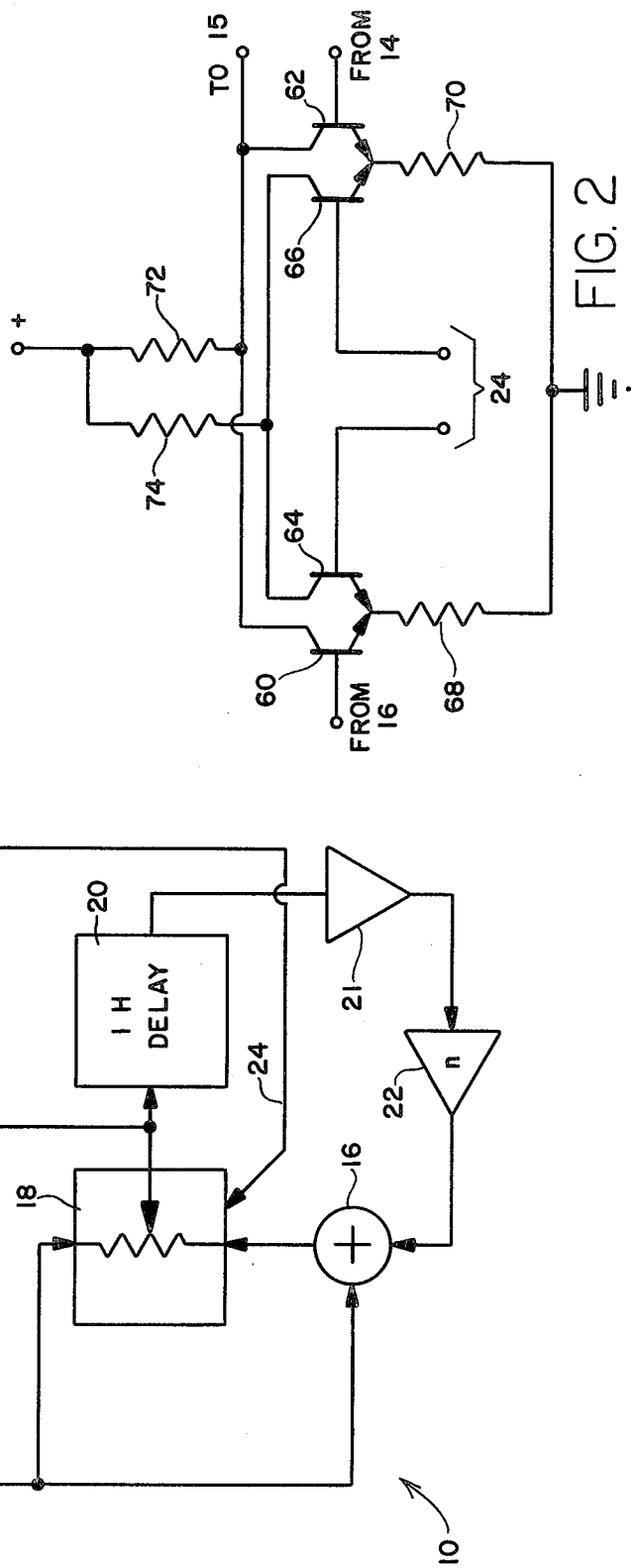

CHROMA NOISE REDUCTION SYSTEM FOR QUADRATURE MODULATED COLOR TELEVISION PICTURE SIGNALS

BACKGROUND OF THE INVENTION

The present invention relates to an improved method and apparatus for reducing unwanted noise in the chroma component of a quadrature modulated color television picture signal. More particularly, the present invention achieves chroma noise reduction by ordinarily averaging chroma by use of a recirculating delay line which feeds back a predetermined fractional component of the chroma to the input; when vertical transitions are detected, the recirculated chroma component is switched out, in proportion to the magnitude of the luminance or chrominance transition, whichever is greater.

The problem of noise in chroma components of a quadrature modulated color television signal has been previously addressed by workers in the art.

One solution was proposed by Ray Milton Dolby in U.S. Pat. No. 3,978,409, wherein he suggested a boost of chroma only during low level chroma transition conditions. The boost was provided by adding a low level, dynamically modified chroma component to a main chroma path at an encoder stage of a system. A complimentary bucking of the chroma path was provided at a subsequent decoder stage by subtraction of a second dynamically modified chroma component which closely complemented the first dynamic component. The resultant chroma closely modelled the original, with noise reduced during low signal activity periods. When high chroma activity was present, the Dolby system stopped acting, and it left noise components untouched. In fact, the Dolby approach only operated when chroma transitions did not exceed 10% of the maximum chroma amplitude. The practical drawback of the Dolby system insofar as applied to chroma noise reduction is that the human eye is too insensitive to low level chroma transitions, and little is gained in subjective picture quality by limiting chroma noise reduction processing to the low activity chroma elements.

Another prior art approach was disclosed in the Kaiser et al. U.S. Pat. No. 4,064,530 as improved by the approach set forth in the later Rossi et al. U.S. Pat. No. 4,107,739. In that approach, a switching signal provided for soft switching between incoming video and recirculating video on a frame by frame comparison basis. Although Rossi et al. properly identified the need to make the switching waveform wider than the signal to be switched, i.e. starting before and stopping after such signal, a significant drawback of the Rossi et al. approach was that the recirculating video itself provided the means by which the switching control signal was generated. The practical consequence of that approach was that the motion evaluation means was not able to separate true picture motion from noise and other random disturbances occurring over the relatively long period separating like positioned picture elements between each frame. Another significant drawback of the Rossi et al. approach was the high cost of one-frame delay lines or elements, as compared with the one-line delay elements used to implement the present invention.

The present applicant proposed a solution to chroma noise reduction in his U.S. Pat. No. 4,240,105. Therein, this applicant described a comb filter separator for chrominance which effectively reduced noise and unwanted picture artifacts, except at major chrominance transitions. It has been statistically noticed that, generally, a chroma transition coincides with a luminance transition. A luminance transition is usually a very stable signal, with a high signal-to-noise ratio. Consequently, it may be treated as a reliable indicator of the presence of a chroma transition, except in very rare circumstances. Thus, the present applicant proposed to substitute bandpass filtered chrominance in lieu of combed chrominance at the instance of detected vertical luminance transitions, in order to remove unwanted artifacts generated by a comb filter at such transitions. The overall results of the applicant's prior invention were very acceptable, yet that system was complicated by the need for multiple delay lines and was generally more complex.

Others have proposed to reduce chroma noise by averaging chroma over several lines, e.g. four lines. The known approach to implement such averaging was to employ multiple delay lines and combine in phase predetermined amplitude components of the multiple-delayed chroma. That approach had the drawback of complexity and expense in requiring multiple delay lines and summing junctions.

While a recirculating delay line approach is suggested by Dolby in his patent described above, and is known in the prior art, there are drawbacks in picture quality which present themselves as smearing at vertical transitions in the picture. The present invention advantageously combines the inexpensiveness of a recirculating delay line with the linearly proportional or "soft" switch to provide unrecirculated chroma only, during vertical subject matter transitions in the picture to achieve a truly superior color picture in which the chroma noise has been effectively reduced.

OBJECTS AND SUMMARY OF THE INVENTION

A general object of the present invention is to reduce noise in the chroma component of a color television picture signal by averaging chroma information over several lines which is achieved by recirculating the chroma component through a single one-line period delay line.

Another object of the present invention is to switch off chroma averaging whenever a luminance or chrominance transition is detected, by using a switch which is generally proportional in switching action to the amplitude of the detected vertical luminance or chrominance transition or to the amplitude of the greater of luminance and chrominance detected vertical transitions.

A further object of the present invention is to achieve significant reduction of noise in the chroma path of a color television picture signal without introducing noticeable unwanted picture artifacts into the color content of the picture.

Yet another object of the present invention is to provide an effective chroma noise reduction pre-processor for frame delay noise reduction systems such as exemplified by the Rossi et al. patent discussed above, whereby noise is removed from the video before picture element comparison is made on a frame to frame basis so that those prior systems do not mistake noise and random aberrations as true picture motion.

One more object of the present invention is to provide a superior chroma noise reduction system with a minimum number of readily available, relatively inexpensive components which are easily assembled and packaged, and which are reliable in use over long periods of time without maintenance or adjustment being required.

Still another object of the present invention is to provide a vastly improved chroma noise reduction method and apparatus which is applicable to NTSC and PAL television signal formats, and which may be implemented in analog or digital circuitry with equal ease and effectiveness.

The system which achieves the foregoing and other objects includes a chroma input, a chroma output, and a recirculating delay line circuit which may comprise a one-line period delay line, a gain control amplifier and a summing junction. The delay line circuit delays chroma by a one line period and then combines a predetermined less than unity amplitude component of the delayed chroma with the chroma presently on the chroma path. A luminance vertical transition detector detects the occurrence of vertical transitions above a preset minimum threshold and generates a control signal related to the absolute value amplitude of the detected transition. Additionally, a chrominance vertical transition detector may be included, and the control signal in that case is related to either the higher amplitude of detected transitions in the luminance or chrominance, or it is a combination of both transitions in accordance with a predetermined criteria. A proportional switch, controlled by the control signal, switches the chroma path from recirculating chroma to unrecirculated chroma in proportion to the vertical transition amplitude. The chrominance transition control signal may be inhibited in the absence of chroma in the combed chroma path to avoid unnecessary switching and crosstalk between luminance and chrominance.

The method of the present invention includes the following steps:

a. Delaying chroma by a period equal to an integral function (i.e. one line period and integral multiples thereof) of the television line period in order to provide delayed chroma in phase with subsequent lines;

b. Combining a predetermined amplitude component of delayed chroma with undelayed chroma to provide a chroma composite;

c. Detecting vertical transitions in the luminance component of the picture being processed and generating a control signal related to the detected vertical transition;

d. Normally putting out the chroma composite, and switching to the unrecirculated chroma in lieu of the composite in proportion to the amplitude of the control signal, so that for large vertical transitions the switch over is virtually complete while for slight transitions, the switching action is slight.

The method may include a further step of detecting vertical transitions in the chrominance component of the picture being processed and the step of generating a control signal includes the step of generating it in relation to the greater of each luminance or chrominance detected vertical transition or as a combination of the two detected transitions in accordance with a predetermined criteria.

The method may include a further step of inhibiting the control signal derived from chrominance when there is no chroma present in a combed chroma path in order to avoid unnecessary switching.

These and other objects, advantages and features will become apparent to those skilled in the art from a consideration of the following detailed description of a preferred embodiment presented in conjunction with the accompanying drawings.

BRIEF DESCRIPTION OF THE DRAWINGS

In the drawings:

FIG. 1 is a block diagram of apparatus implementing an improved chroma noise reduction system for quadrature modulated television picture signals in accordance with the present invention.

FIG. 2 is a schematic circuit drawing of an electronic switch having proportional switching characteristics which may be used in an analog implementation of the system described in FIG. 1.

DETAILED DESCRIPTION OF PREFERRED EMBODIMENTS

Figure 4:
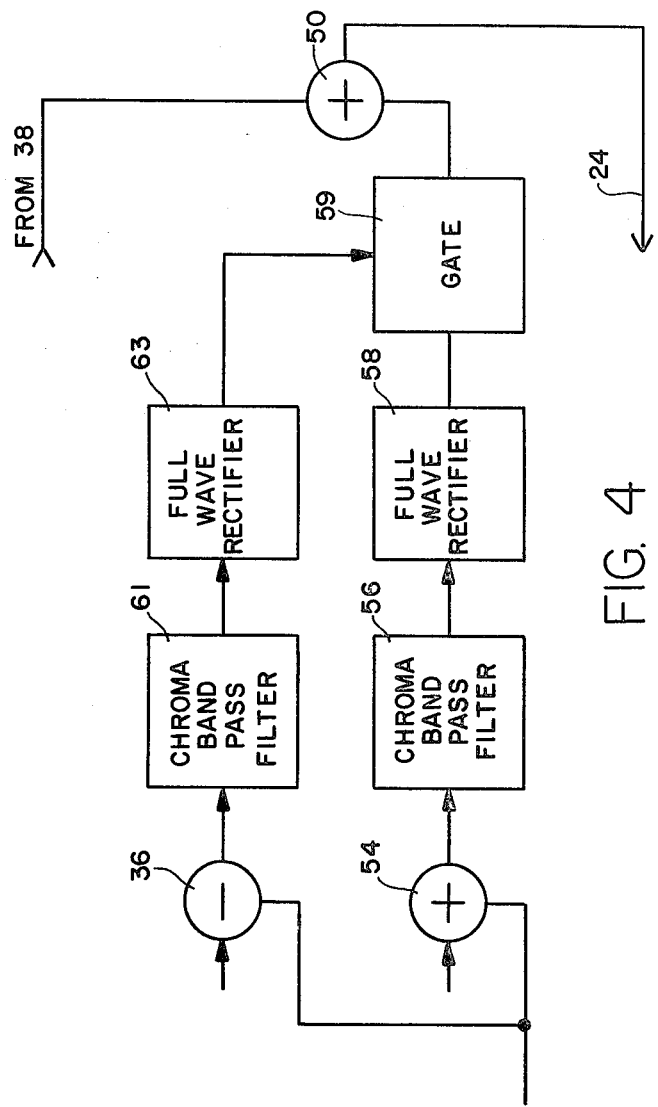
FIG. 4 is a block diagram of an additional switching suppression circuit which may be included within the FIG. 1 apparatus to prevent unwanted crosstalk and other artifacts in some applications.

An improved chroma noise reduction system 10 in accordance with principles of the present invention is set forth in FIG. 1. Therein, the system 10 includes an input 12 which receives a quadrature modulated color television signal such as is present in the playback path of a helical scanning video cassette recorder, now widely available in the consumer television marketplace.

Noisy chroma is separated from the composite color signal by a bandpass filter 14, and processed and noise-reduced chroma is put out by the system 10 at an output node 15.

The separated, noisy chroma goes to a summing junction 16 and also to a proportional switch 18. An analog implementation of the switch 18 is described hereinafter in connection with FIG. 2. A digital proportional switch is appropriately included in a digital implementation of the present invention, and its structure, function and implementation are known to those skilled in the art.

The switch 18 normally connects the output 15 to the output node of the summing junction 16. The chrominance at the output 15 is passed through a one-line-period (1 H) delay line 20, through a phase inverter 21 and then through a gain fixing amplifier 22 which provides an output of 1 H delayed chrominance with a gain of less than unity, and preferably set at about 70% of unity. The delayed and gain controlled chroma from the amplifier 22 is added to incoming undelayed chroma of unity value, i.e. whatever the actual value of the chroma happens to be at each instant of time. The resultant chroma composite sum is then sent to the switch 18 as already mentioned.

The action of the switch 18 is controlled by a control signal provided on a control line 24. The control signal is a composite which is derived from and proportional to the amplitudes of independently derived and processed luminance and chrominance transitions. The control signal may represent the linear combination of such detected transitions, or it may be proportional to the higher one of the detected transitions.

Composite quadrature modulated video from the host system is received at the video input 12 and is passed through another 1 H delay line 34. Delay lines 20 and 34 may be implemented with ultrasonic glass devices, charge-coupled devices or using digital techniques. The delayed composite is then provided to a subtraction junction 36 which is followed by a low pass filter 37. When there are no transitions from line to line in the luminance path (i.e. no luminance vertical transitions), the output of the low pass filter 37 is zero. Whenever a transition is detected as characterized by the presence of a difference at the low pass filter 37, it is rendered independent of sign by operation of a full wave rectifier circuit 38 and is then passed on to an adder junction 50 as a luminance component of the ultimate composite control signal. The luminance component from the rectifier 38 is of the same magnitude as the luminance transition, but is independent of the direction of the transition, i.e. an absolute value thereof.

The full wave rectifier 38 includes a threshold circuit which is preset with a threshold value of about one IRE unit, or equivalent, for the luminance component. This low threshold value has been found to be adequate to eliminate noise and other random disturbances present in the low frequency luminance component.

If the sign independence function is to be achieved by rectification with analog circuitry, then such circuitry may conveniently include a transistor pair having commonly connected emitters. The threshold setting circuit may include a further transistor connected in series with the commonly connected emitters of the full wave rectifier circuit. Such connections are known by those skilled in the art.

Undelayed video and video delayed by the 1 H delay line 34 are also provided to another adder junction 54. The adder is followed by a band pass filter 56 designed to pass the chroma frequency band. Normally, when there are no transitions from line to line in the chroma path (i.e. no vertical chroma transitions), the output band of the band pass filter 56 is zero. Whenever a chroma vertical transition occurs, a signal appears at the output of the band pass filter 56, and this signal is then passed through a second full wave rectifier 58.

The full wave rectifier 58 also provides a threshold function such that there is no output therefrom unless the output of the band pass filter 56 exceeds about 5 to 8 IRE units, or equivalent. This higher threshold has been found useful to eliminate any switching action being initiated on account of random phase disturbances and other noise modalities which characterize chrominance and require noise reduction thereof. Such random disturbances are much more likely to be present in the chrominance path than in the low frequency luminance. The rectifier 58 and its separate threshold circuit may be implemented in an analog system with a circuit such as was previously described for the rectifier 38, or its sign elimination and threshold establishing functions may be achieved by digital processing.

The output of the full wave rectifier 58 is combined with the luminance control component in the "adder" junction 50. The "adder" 50 configuration provides an output proportional to the higher of the luminance and chrominance control components it receives. The adder 50 puts out the control signal on the line 24 to control the "soft switch" 18, sometimes called a "cross-fader". The action of the adder 50 may be linearly additive or it may be selective. In any event, the function of the adder 50 is to generate and put out a control signal in response to one or both of the luminance and chrominance control components in accordance with a predetermined criteria.

In some applications it may be desirable to inhibit the chroma transition control pulse when the combed chroma level is below a certain threshold. It is not necessary to practice any switching when the chroma is so low as being virtually not visible on the display screen. High frequency luminance may also be mistaken for chrominance vertical transitions by the chrominance control circuit comprising the elements 54, 56 and 58 of FIG. 1, and the proposed inhibition will prevent such errors.

A second embodiment of the present invention is depicted as an addition of the circuit elements of FIG. 4 to the basic apparatus depicted in FIG. 1. The function of the FIG. 4 circuitry is to enable the signal from the full wave rectifier 58 to reach the adder 50 only when a significant combed chroma level is present at the output of the subtractor 36. The FIG. 4 circuitry includes a gate 59 interposed between the rectifier 58 and adder 50 of the FIG. 1 circuit. The gate 59 is controlled by a signal derived from a connection to the subtractor 36, followed by a chroma band pass filtering in a chroma band pass filter 61, followed by absolute value derivation by passage through a full wave rectifier circuit 63 to eliminate transition direction (sign).

The additional circuitry of FIG. 4 may be useful in a system when the chrominance may be a component of composite video. It is desired that all luminance and chroma be perfectly combed prior to their addition following processing in separate paths. This requirement is to prevent crosstalk between the two channels. For example, it would be undesirable to introduce unwanted artifacts into chroma from the luminance path, and vice versa. Without the inhibition gate 59 and its related control circuitry 61 and 63, there is a possibility of introduction of unwanted artifacts into chroma from the luminance path. Of course, another comb filter could be used to remove such artifacts, but it is much simpler to prevent the unwanted crosstalk at its point of origin rather than have to remove it subsequently.

The soft switch 18 is depicted schematically in FIG. 2. While the implementation shown there is known in the prior art, it is well adapted to provide the switching function required by the present invention. In essence, the switch 18 comprises two complementary differential amplifiers. Two complementary action switching transistors 60 and 62 accomplish the proportional switching between the summed composite chroma from the adder 16 (normal position) and the undelayed chroma from the bandpass filter 14 (switched position). Two control transistors 64 and 66 are connected to control the transistors 62, 64 respectively. The control line 24 is shown as two paths which are electrical complements. For example, as one control line goes positive, the other one goes equally negative, and vice versa. A common emitter resistor 68 connects the control transistor 64 to the switch transistor 60, and another common emitter resistor 70 connects the control transistor 66 to the switch transistor 62. Load resistors 72 and 74 decouple the transistor pairs 60-62 and 64-66, respectively, from the power supply. The output is provided from the commonly connected collectors of the switch transistors 60 and 62. The characteristics of the switch 18 are that the the output remains at unity by summing components of the switched signals, in accordance with proportional control signals derived from the luminance-chrominance combiner circuit 50.

Figure 3A:
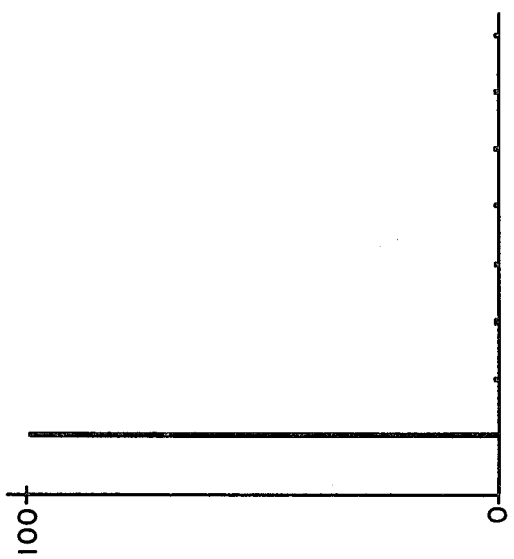
FIG. 3 is a graph pair illustrating the operation of the system described in FIG. 1.
Figure 3B:
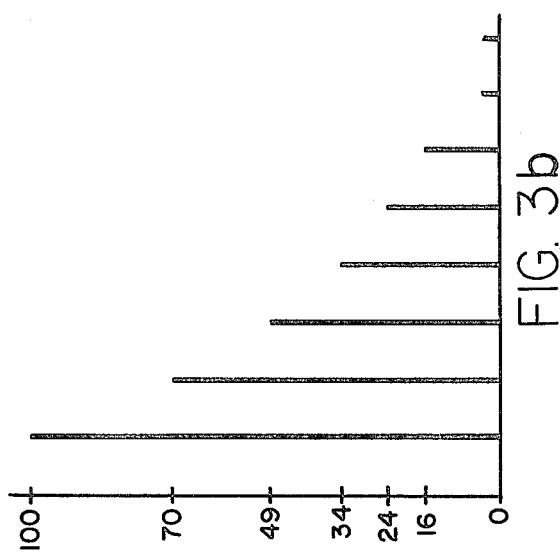

Operation of the recirculating chroma noise reduction delay line system 10 is depicted in the graphs of FIG. 3. Therein, the abcissa represents chrominance in 1 H increments. The ordinate represents IRE units (amplitude) of chrominance. In the graph of FIG. 3a the chrominance amplitude in the first line is shown at 100 IRE units. A transistion to zero follows, and for each succeeding line, the chroma is at zero IRE units. The output 15 of the chroma system, in response to the situation presented in the FIG. 3a graph is shown in the FIG. 3b graph. Therein, the chroma is recirculated and put out in successive lines at a certain percentage or fractional loop gain of the immediately preceeding value. This situation occurs only when chroma information is unaccompanied by a luminance or chrominance transition.

If n is the recirculating loop gain, the signal through a number of horizontal lines will be proportional to:

$$S = 1 + n + n^2 + n^3 \ldots + n^n \quad (1)$$

while the noise will be given by:

$$N^2 = 1 + n^2 + n^4 + n^6 \ldots + n^{2p} \quad (2)$$

The limit of this function, when n tends toward infinity, is given by:

$$S = \frac{1}{1 - n} \quad (3)$$

and $$N^2 = \frac{1}{1 - n^2} \quad (4)$$

The signal to noise improvement is therefore given by:

$$S/N = \frac{\sqrt{1 - n^2}}{1 - n} \quad (5)$$

or $$S/N = \sqrt{\frac{1 + n}{1 - n}} \quad (6)$$

As an example for n=0.7, the signal to noise improvement will be 7.5 db, and the information contained in one scanning line will still be present in ⅓ amplitude three lines later. For n=0.85, the signal to noise improvement will be 12 db; but for a given scanning line, chroma information will be still present at half amplitude six scanning lines later. Switching logic is therefore mandated in order to remove the unacceptable vertical chroma "blurring" occurring during a chroma vertical transition.

In the instance of a chroma or luminance transition of large magnitude, the system 10 will switch completely to undelayed chroma from the filter 14. For small chroma transitions, the loop gain n will be reduced but not eliminated completely, as low amplitude chroma displacements are not visible and some amount of noise reduction will be achieved.

It is apparent that this invention applies to all quadrature modulated subcarrier color television standards, including NTSC and PAL. The PAL waveform, however, must be converted into an NTSC-like format by the well-known "PAL Modification Technique" prior to processing within the present system, and it must be reconverted to the PAL format after processing in accordance with the well-known Modification Technique.

While the apparatus and method of the present invention have been summarized and explained by an illustrative application in chroma noise reduction by use of a proportionally switched recirculating chroma delay line controlled by separately detected vertical luminance and chrominance transitions, it will be readily apparent to those skilled in the art that many widely varying embodiments and applications using analog or digital circuits and methods are within the teaching and scope of the present invention, and that the example presented herein is by way of illustration only and should not be construed as limiting of the scope of this invention.

I claim:

1. An improved method for reducing noise in a chrominance component of a quadrature modulated color television signal wherein said chrominance component has been separated therefrom, said method comprising the steps of:
   a. delaying said chrominance component by a period equal to an integral function of the television line period to provide a delayed chrominance component;
   b. phase inverting said delayed chrominance component;
   c. combining a predetermined amount of said delayed and inverted chrominance component with said chrominance component to provide a chrominance composite;
   d. detecting vertical level transitions in a luminance component of said color television signal and generating a control signal proportional to each said detected vertical level transition;
   e. normally putting out said chrominance composite, and proportionally switching to said chrominance component in response to said control signal.

2. The improved method set forth in claim 1 wherein the step of combining a predetermined amount of said delayed chrominance component with said chrominance component includes a step of adjusting the amplitude of said delayed chrominance component to a factor less than unity prior to said combining.

3. The improved method set forth in claim 2 wherein said amplitude is adjusted in a range from 30 to 90 percent of original value.

4. The improved method set forth in claim 1 wherein said step of detecting transistors comprises the steps of:
   a. separating said luminance component from said quadrature modulated color television signal,
   b. low pass filtering said luminance component to pass vertical transitions and to reject higher frequency components of said luminance component,
   c. deriving an absolute value of said luminance vertical transitions irrespective of the direction thereof to provide a luminance control component, and
   d. putting out said luminance control component whenever it exceeds a predetermined threshold to provide said control signal.

5. The improved method set forth in claim 1 wherein said step of detecting transitions comprises the steps of:
   a separately separating said chrominance component from said quadrature modulated color television signal,
   b. band pass filtering said separately separated chrominance component to pass vertical chrominance transitions and to reject other chrominance components, c. deriving an absolute value of chrominance vertical transitions irrespective of the direction thereof to provide a chrominance control component, and d. putting out said chrominance control component whenever it exceeds a predetermined threshold to provide said control signal.

6. The improved method set forth in claim 1 wherein said step of detecting transitions comprises the steps of:

a. separately separating said chrominance component and said luminance component from said quadrature modulated color television signal, b. low pass filtering said separated luminance component to pass vertical transitions therein and to reject other elements thereof, c. band pass filtering said separated chrominance component to pass the vertical transitions therein and to reject other elements thereof, d. separately deriving absolute values of said low pass filtered luminance component and said band pass filtered chrominance component to provide a luminance control component and a chrominance control component, e. setting separate threshold levels for said luminance control component and said chrominance control component, and separately putting out said luminance control component and said chrominance control component whenever each exceeds its separately set threshold level, f. combining said put out luminance control component with said put out chrominance control component and putting out the combination thereof as said control signal.

7. The improved method set forth in claim 6 wherein said step of setting separate threshold levels includes the steps of setting a threshold level for said luminance component at about one IRE unit (1% total amplitude) and setting a threshold for said chrominance component at about five to eight IRE units (5-8% total amplitude).

8. The improved method set forth in claim 6 wherein said step of combining said luminance control component with said chrominance control component is carried out in a linear additive fashion in accordance with a predetermined ratio.

9. The improved method set forth in claim 6 wherein said step of combining said luminance control component with said chrominance control component to provide said control signal includes the step of determining the one of said luminance and chrominance control components having the greater instantaneous amplitude value when both simultaneously occur and putting out said one of greater value as said control signal.

10. The improved method set forth in claim 5 or 6 wherein said step of providing a chrominance control component comprises the additional steps of:

a. separating combed chroma by bandpass filtering an output of a comb filter to derive a combed chrominance component indicative of the presence of chroma;

b. deriving an absolute value of said combed chrominance component;

c. putting out said chrominance control component only when said combed chrominance component is present.

11. An improved system for reducing noise in a chrominance component of a quadrature modulated color television signal wherein said chrominance component has been separated therefrom, said system comprising:

a. an input receiving said separated chrominance component;

b. an output;

c. proportional transition unity gain switching means connected between said input and said output;

d. recirculating delay line means having an input connected to said output for delaying and putting out a delayed chrominance component which has been delayed by an integral function of the televison line period;

e. amplifier means connected to said recirculating delay line means for putting out a predetermined portion of said delayed chrominance component having an amplitude less than unity;

f. summing junction means connected to said receiving input and to said amplifier means for combining said portion of delayed chrominance component with said chrominance component;

g. means for coupling a feedback portion of said delayed chrominance component in combination with said separated chrominance component to said switching means, h. vertical transition detection means connected to receive a luminance component of said color television signal, for detecting vertical signal transitions in said color television signal, and for generating a control signal related to the amplitude of each said detected vertical signal transition of said luminance component and for putting out said control signal to control switching operation of said proportional transition unity gain switching means;

whereby said switching means proportionally switches said output from said feed back portion of said delayed chrominance component in combination with said chrominance component of said chrominance component at said input in direct relation to the magnitude of said control signal.

12. The improved system set forth in claim 11 wherein said vertical transition detection means comprises a comb filter connected to receive and filter said television signal to extract a luminance component therefrom and absolute value determining means connected thereto to render said separated luminance component independent of sign and further comprising threshold providing means for providing a threshold level above which said absolute value luminance component is put out as said control signal.

13. The improved system set forth in claim 12 wherein luminance vertical transition detection means further comprises a low pass filter connected between said comb filter and said absolute value determining means.

14. The improved system set forth in claim 13 wherein said comb filter comprises a one line period delay line and a subtraction circuit connected to subtract a preceding line from a current line.

15. The improved system set forth in claim 11 wherein said vertical transition detection means comprises a comb filter connected to receive and filter said television signal to extract a chrominance component therefrom and absolute value determining means connected thereto to render said separated chrominance component independent of sign and further comprising threshold providing means for providing a threshold level above which said absolute value chrominance component is put out as said control signal.

16. The improved system set forth in claim 11 wherein said vertical transition detection means comprises a comb filter connected to receive and filter said television signal to extract a luminance component and a chrominance component therefrom, a low pass filter means connected to said luminance component providing portion of said comb filter for passing vertical transitions in said luminance component, band pass filter means connected to said chrominance providing portion of said comb filter for passing vertical transitions in said chrominance component, absolute value determining means for separately determining the absolute value of said low pass filtered luminance component and said band pass filtered chrominance component, and separate threshold setting means for separately establishing minimum threshold levels for said luminance component and said chrominance component and for putting each out when it is above its threshold level, and combining means for combining said put out absolute value luminance component and said put out absolute value chrominance component to provide said control signal.

17. The improved system set forth in claim 15 or 16 further comprising chrominance band pass filter means connected to said comb filter for deriving a combed chrominance component, absolute value determining means connected to said band pass filter means for deriving an absolute value of said combed chrominance component, and gate means connected to control said vertical transition means for putting out said control signal only when said combed chrominance component is present.

18. The improved system set forth in claim 17 wherein said absolute value determining means comprises full wave rectifier means.

19. The improved system set forth in claim 16 wherein said combining means adds said absolute value luminance component with said absolute value chrominance component to provide said control signal.

20. The improved system set forth in claim 16 wherein said combining means selects the higher one of said absolute value luminance component and said absolute value chrominance component when both simultaneously occur and puts out said selected one as said control signal.

21. The improved system set forth in claim 12, 15 or 19 wherein said absolute value determining means comprises full wave rectifier means.

* * * * *